Jan. 15, 1924.  1,480,850
A. W. ALLEN ET AL
AUTOMOBILE JACK AND SHIFTER
Filed July 5, 1921  4 Sheets-Sheet 3
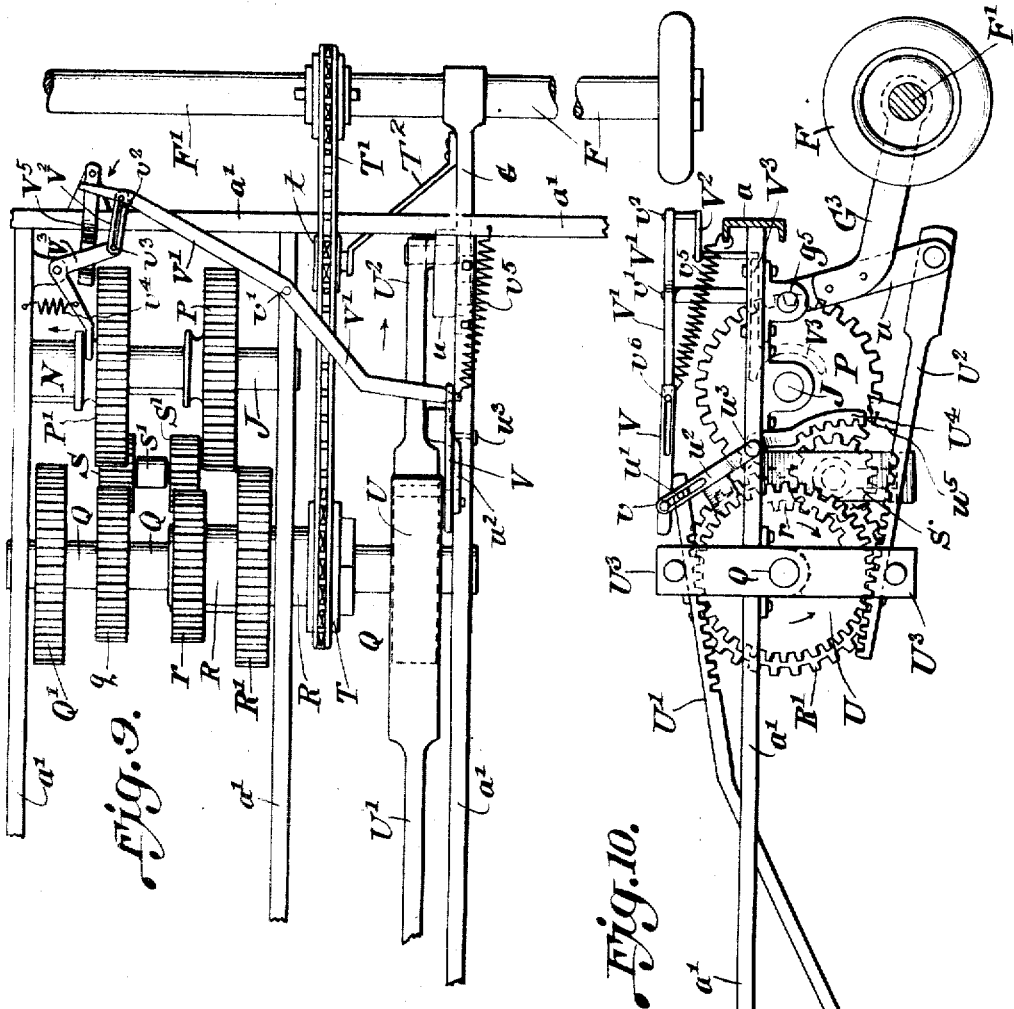
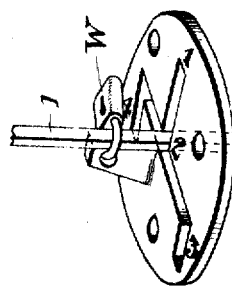
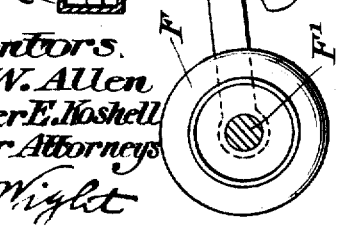
Inventors.
Arthur W. Allen
Alexander E. Koshell
by their Attorneys

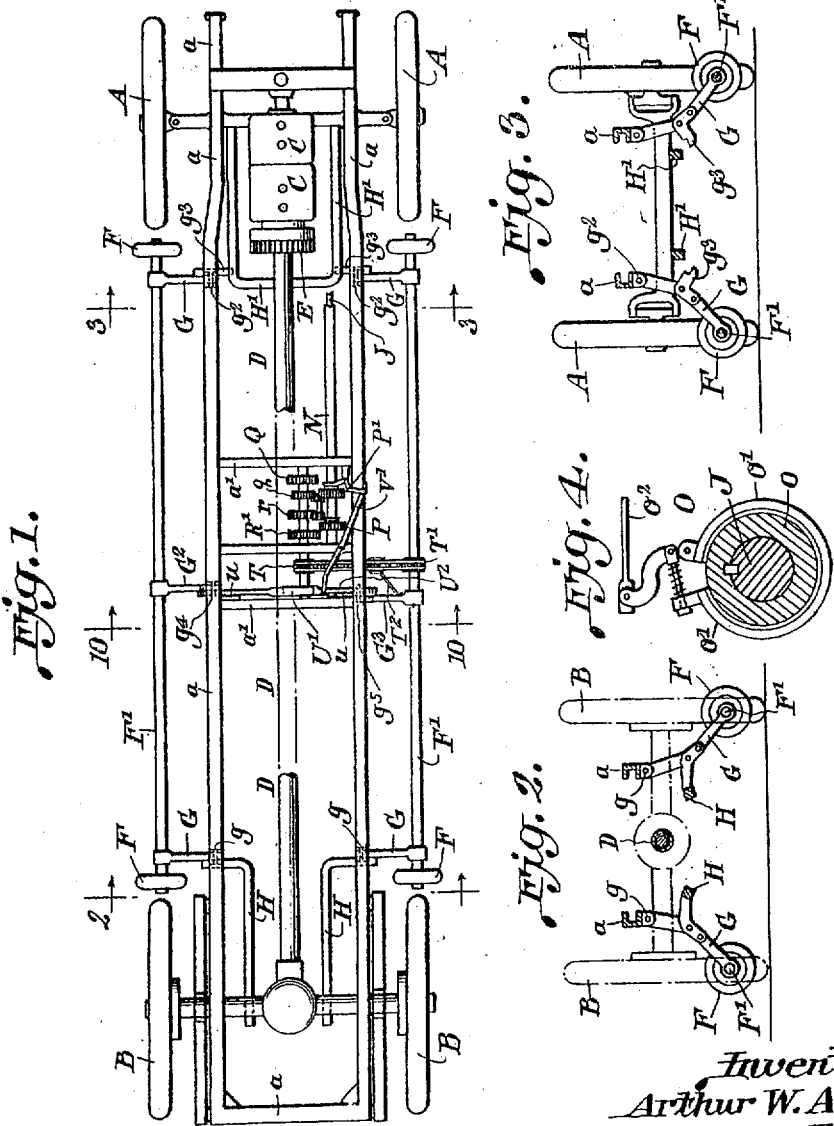

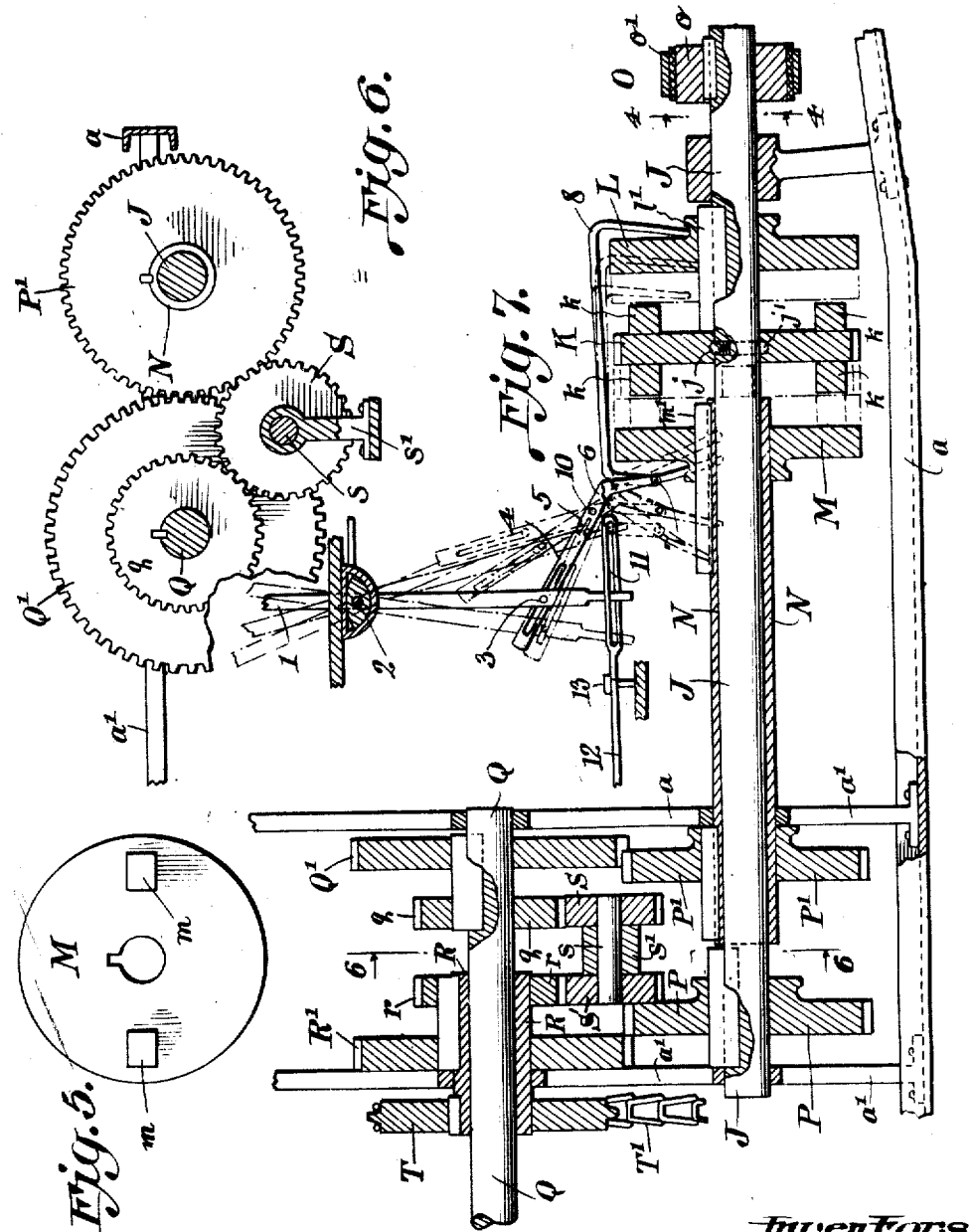

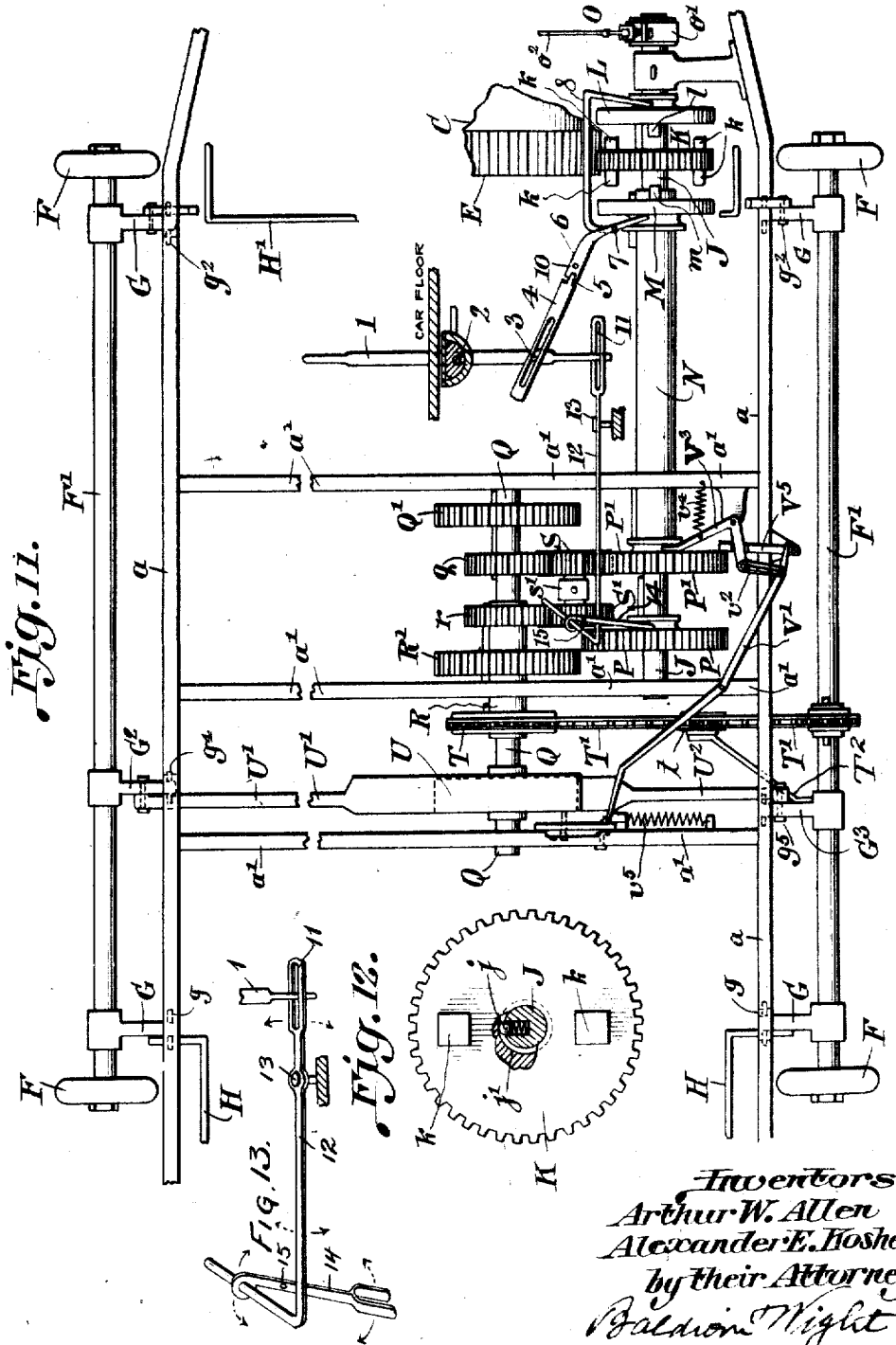

Patented Jan. 15, 1924.

1,480,850

UNITED STATES PATENT OFFICE.

ARTHUR W. ALLEN AND ALEXANDER E. KOSHELL, OF SACRAMENTO, CALIFORNIA.

AUTOMOBILE JACK AND SHIFTER.

Application filed July 5, 1921. Serial No. 482,339.

*To all whom it may concern:*

Be it known that we, ARTHUR W. ALLEN and ALEXANDER E. KOSHELL, both citizens of the United States, and both residing in Sacramento, in the county of Sacramento and State of California, have invented certain new and useful Improvements in Automobile Jacks and Shifters, of which the following is a specification.

Our invention provides means for raising and lowering an automobile and for moving it sidewise to shift its position.

It is of course necessary to frequently raise an automobile from the ground for purposes of inspection and repair and many devices have heretofore been used for this purpose but it is also desirable at times to shift the automobile sidewise in order that it may be properly parked and withdrawn from a parking space.

According to our invention, we install on an automobile mechanism whereby the vehicle, when not running, may be raised a short distance from the ground to relieve the tires of the wheels from weight and strain and for purpose of inspection and repair, and whereby it may be shifted sidewise in such manner as to move into a parking space close to a curb and may also be moved away from the curb without colliding or interfering with other vehicles even though they be in close proximity.

The mechanism which we use for this purpose is light, strong and durable and may be installed at small expense. The mechanism may be readily attached to the vehicle and it is so constructed that power is applied to the mechanism by the automobile engine and this mechanism is controlled by a single lever within easy reach of the driver and which may be operated to cause the vehicle to be raised and lowered and also to be moved sidewise in either direction.

In the accompanying drawings illustrating our invention—

Figure 1 is a top plan view of the frame or chassis of an automobile showing more or less diagrammatically how our improvements are applied, the details of construction being shown in other figures of the drawings.

Figure 2 shows a transverse section on the line 2—2 of Fig. 1.

Figure 3 shows a transverse section on the line 3—3 of Fig. 1.

Figure 4 is a detail view in section on the line 4—4 of Fig. 7 of brake mechanism which is applied to one of the transmission shafts.

Figure 5 shows a side elevation of one of the toggle discs forming part of the gearing.

Figure 6 shows a section of some of the gearing on the line 6—6 of Fig. 7.

Figure 7 is a sectional view of the gearing from the engine to the driving shafts which operate the raising and lowering mechanism and also the mechanism for giving a sidewise movement of the vehicle.

Figure 8 is a perspective view of the operating lever and its guide plate.

Figure 9 is a plan view of the driving mechanism.

Figure 10 shows a side elevation of this mechanism looking in the direction of the arrows marked 10, 10 in Fig. 1.

Figure 11 is a plan view, showing more completely the mechanism for transmitting power from the engine to the mechanism which raises and lowers the vehicle and also moves it sidewise.

Figure 12 is a view in side elevation and partly in section of a toggle gear forming part of the transmission mechanism.

Figure 13 is a view of a detail of the gear shifting mechanism.

We have shown our improvements applied to the frame or chassis of an automobile, but it is obvious that it may be applied to the frame or running gears of trucks and vehicles of various kinds.

In Fig. 1 parts of the automobile frame are indicated at $a$, $a'$. The front wheels are shown at A and the rear wheels at B. The engine C is connected to the rear axle by a shaft D, and E indicates a spur wheel on the engine shaft by means of which power is transmitted from the engine to the mechanism for raising and lowering and shifting the vehicle.

In Figs. 1, 2 and 3 we have indicated, generally, the mechanism for raising and lowering and shifting the vehicle. This is done by four rollers or small wheels F which may be provided with rubber tires and which are mounted on axles F', mounted in the outer ends of hangers G, pivotally connected at $g$ and $g^2$ to the frame bars $a$. At the rear end of the vehicle the hangers G are connected with a frame H which extends under the rear axle so that when the hangers G are swung inwardly the frame bars H will engage the rear axle and assist in raising it. At the front of the vehicle the hangers G are pivotally connected at $g^2$ to the frame bars $a$ and they are provided with arms $g^3$ which extend under a frame H′ secured to the front axle, the construction being such that when the front roller wheels F are moved inwards the arms $g^3$ will engage the frame H′ to assist in raising the vehicle.

When the roller wheels F are moved inwards towards each other by the mechanism hereinafter described they will engage the ground and simultaneously lift the vehicle at both ends, raising it a short distance, say an inch from the ground, so that the wheels may be relieved of all strain and may also be readily inspected and repaired. When the machine is thus raised the engine may be operated to revolve the rear wheels if desired to see whether or not they are running true. One of the axles F′ is revolved by mechanism connecting it with the engine, which mechanism will be hereinafter explained, but it will thus be seen that the mechanism is such that the automobile may be raised and lowered, and when raised it may be shifted or moved sidewise in either direction.

The lifting and lowering and shifting mechanism is operated by the engine C, in the manner indicated particularly in Figs. 7 and 11.

Extending longitudinally of the machine is a shaft J which we call the transmission shaft. This shaft carries a cog wheel K which we call a toggle gear inasmuch as it carries on opposite sides lugs $k$ adapted to engage corresponding lugs $l$ and $m$ on transmission discs L and M mounted respectively on the shaft J and on a tubular shaft N through which the shaft J extends. The toggle gear K is adapted to mesh with the spur wheel E operated by the engine. It is formed with a recess $j'$ to receive a spring-pressed ball $j$ carried by the shaft J.

The gear K may stand normally out of engagement with the gear E but is adapted to be placed in position to mesh therewith as hereinafter set forth. When in meshing position the ball detent $j$ holds it against accidental endwise movement, although it does not prevent rotary movement of the gear K relative to the shaft. The gear K is caused to rotate either the shaft J or sleeve N according as the wheel L or the wheel M is moved so that the projections thereon engage the lugs $k$ on the wheel K.

The shafts J and N are mounted in suitable bearings in the frame and the shaft J is provided with a brake O by means of which its revolution may be impeded when desired. Any suitable brake mechanism may be used. As shown in Fig. 4, it comprises a short sleeve $o$, keyed to the shaft J, and surrounded by a brake strap $o'$, connected to a rod $o^2$ which may extend to a lever within easy reach of the driver.

The shaft J extends rearwards through the frame bars $a'$ and to the shaft is keyed a spur wheel P which has a sliding connection with the shaft J. A spur wheel P′ is keyed to the tubular shaft N and has a sliding connection therewith. These gears P, P′ are adapted to transmit power from the shafts J and N to a rotatable sleeve R and a driving shaft Q about which the sleeve R is adapted to move. The shaft Q carries a spur wheel Q′ and a pinion $q$ and the sleeve R carries a spur wheel R′ and a pinion $r$. None of these gear wheels Q′, $q$, R′, $r$ have an endwise movement but are adapted to rotate about the axis of the shaft Q. The pinions $q$, $r$ are adapted to engage with pinions S and S′ loosely carried by a short shaft $s$ mounted in bearings in a support $s'$. When the wheel P′ engages the wheel Q′ the shaft Q is moved in one direction. When the wheel P′ engages the toothed wheel S shaft Q is rotated in the opposite direction.

In like manner when the toothed wheel P is engaged with the toothed wheel R′ the sleeve R is turned in one direction and when the toothed wheel P engages the toothed wheel S′ the sleeve R is moved in the opposite direction.

The sleeve R carries a sprocket wheel T which is connected with one of the axles F′ by a sprocket chain T′. An arm T² carried by the adjacent hanger G carries a pinion $t$ which engages the sprocket chain T′ to take up the slack during the movement of the hangers G and shaft F′. The mechanism may be so operated as to cause the wheels F to be turned in either direction so as to shift the machine either to the right or to the left. The manner in which the machine is raised and lowered will be hereinafter described, it being understood that the machine is not shifted until it is lifted.

As shown in Fig. 9 and also in Fig. 10, the shaft Q carries a spur wheel U with which engages two toothed rack bars U′, U² which are connected with arms $u$ of hangers G², G³ pivotally connected at $g^4$, $g^5$ with one of the frame bars $a'$. The rack bars are guided in a frame U³ of any suitable construction.

When the shaft Q is turned in the proper direction the rack bars are operated to draw the wheels F and their axles F′ inwards towards each other and the machine is thus raised from the ground.

The mechanism is operated and controlled by a lever 1 extending through the floor of the automobile, its handle being within easy reach of the driver. This lever is supported by a universal joint 2 so that it may be rocked fore and aft and to the right and to the left. It is connected at 3 by a pin-and-slot connection to a bar 4, jointed at 5 with a shifter member 6, pivoted at 10 to the frame. Said shifter member 6 engages the grooved hub of the disc M. The member 6 is jointed at 7 to a shifter member 8 which engages the grooved hub of the disc L. By means of the lever 1 the discs L and M may be moved endwise on the shafts J and N towards and from the toggle gear K.

In Figs. 7 and 11 the lever mechanism is shown laid over on one side. these views being in the main plan views but in order to indicate the operation of the lever it has been illustrated in the manner just described.

The lower end of the lever 1 extends through a slot 11 in a rod 12, pivoted at 13 to the frame, and connected with a shifting member 14, pivoted at 15 and engaging the grooved hub of the gear P. By these devices when the lever 1 is moved to the right or to the left the gear P is moved endwise on the shaft J and may thus be made to engage either the spur wheel R' or the intermediate gear S'.

It will be observed by reference to Fig. 10 that the rack bar U' is connected by a pin-and-slot connection $u'$ with an arm $u^2$ pivoted to the frame at $u^3$ and carrying a toothed shoe U⁴ adapted to engage the toothed wheel U.

When the rollers F are drawn under the automobile to raise it the shoe U⁴ engages the spur wheel U and acts as a latch to lock it and thus hold the automobile in raised position.

Also at this time the lug $u^5$ on rack bar U² will engage end of shoe U⁴.

The arm $u^2$ has a slot-and-pin connection $v$ with a link V having a slot-and-pin connection $v^6$ with a lever V' pivoted at $v'$ to the frame and having a slot-and-pin connection $v^2$ with a link V² in turn having a slot-and-pin connection $v^3$ with a bell crank lever V³ pulled in one direction by a spring $v^4$ and engaging the hub of the gear P'. The lever V is pulled in one direction by a spring $v^5$. The end of the lever V' beyond the connection $v^2$ is supported by a recessed spring V⁶ which exerts such pressure on the lever that it cannot be accidentally moved.

The mechanism hereinbefore described for raising and lowering an automobile or other motor-driven vehicle and for shifting it may be readily attached to the machine. By this mechanism the machine may be raised from the ground so as to relieve the wheel tires from weight or strain and for purposes of inspection and repair. The machine may be quickly moved sidewise close to a curb between other machines and may be easily moved sidewise away from the curb and into the clear roadway without colliding or interfering with machines parked in front of or in rear of it. The mechanism is controlled by a single lever within easy reach of the driver. When the machine is raised it is locked in raised position and by locking the operating lever the machine thus raised cannot be stolen as the road wheels are off the ground and the machine cannot be towed except sidewise which is impracticable. The power for raising and lowering the machine and for moving it sidewise is from the engine of the automobile.

The manner in which the mechanism is operated will no doubt be understood from the foregoing description but may be summarized as follows:

Assuming the operating lever to be in neutral position, if the lever be moved forward to position 1 indicated in Fig. 8, the toggle disc M will move the toggle gear K into engagement with the cog wheel E on the engine shaft, and it will be held there by the spring-pressed ball $j$ which engages in the recess $j'$ of the toggle gear. Then if the lever be moved backwards to its vertical or neutral position it will leave the toggle gear in engagement with the spur wheel E and the engine may then be started and allowed to idle slowly. Then if the lever 1 be again moved forwards to position 1 in Fig. 8 the toggle disc M will engage the toggle gear K and the tubular shaft N will be rotated. At this time the cog wheel P' engages the intermediate toothed wheel S and will cause the rotation of th shaft Q which carries the spur wheel U, engaged by the rack bars U', U². This operation causes the rollers F to be drawn inwards towards each other and to raise the machine and the latch U⁴ is at the same time operated and the mechanism is located in raised position. During this operation the lever V' is moved by the spring $v^5$ and is held in shifted position by the spring V⁶. At the same time the spring $v^4$ causes the wheel P' to be shifted from the position shown in Fig. 9, which is the raising position, to lowering position (shown in Fig. 7) in engagement with the spur wheel Q', and it is held there, the lever 1 being in the meantime returned to neutral position, and therefore the rotation of the shaft Q is arrested.

The machine can be moved to the right or to the left by means of the lever 1. If the lever 1 be moved to the position 3 (Fig. 8) the rod 12 will be actuated to cause the spur wheel P to engage the spur wheel R' on the tubular shaft R and thus by means of the sprocket wheel T and chain T' will cause the axle F' with which it is connected to rotate in such manner as to move the machine to the right. When thus moving to the right the brake O may be applied if necessary and of course the motion may be stopped also by properly shifting the operating lever to disconnect the gearing from the engine. In order to move the machine to the left the lever is shifted to the position 4 in Fig. 8.

While the machine is in raised position the operating lever 1 may be locked by a pad-lock W and when thus locked the machine cannot be driven or towed away.

When it is desired to lower the machine the lever 1 is pushed forward to the position 1 and the tubular shaft N is thus connected with the engine and the spur wheel P" being at this time connected with the cog wheel Q', the rack bars U', U² will be actuated to lower the machine. Then the lever 1 may be brought back to neutral position and the automobile may be driven in the usual way, the lifting rollers being raised a sufficient distance above the ground to avoid all obstructions.

By the mechanism just described it will be observed all the necessary movements for raising and lowering and for shifting the machine in either direction are made by a single lever.

The mechanism may be installed on automobiles, trucks and other vehicles when first put in service or may be attached to vehicles already in use.

We claim as our invention:

1. The combination with a motor driven vehicle, of rollers carried thereby, means operated by the motor for moving the rollers to raise and lower the vehicle bodily, means operated by the motor to move the vehicle sidewise in either direction when raised and supported by said rollers, and a single operating lever controlling all of said movements.

2. The combination with a motor driven vehicle, of pairs of hangers carried by the vehicle, an axle carried by each pair of hangers, lifting rollers on said hangers, means operated by the motor to swing the hangers and move the rollers to raise or lower the vehicle, and means operated by the motor for turning the axles to shift the vehicle sidewise in either direction.

3. The combination with a motor driven vehicle, of a pair of hangers carried by each side of the vehicle, a longitudinally extending axle carried by each pair of hangers, lifting rollers carried by said hangers, means operated by the motor to swing the hangers and move the rollers to raise or lower the vehicle, and operative connections between the motor and one of the axles to turn the same and shift the vehicle sidewise in either direction.

4. The combination with a motor driven vehicle, of a pair of hangers carried by each side of the vehicle, a longitudinally extending axle carried by each pair of hangers, lifting rollers carried by said hangers, means operated by the motor to swing the hangers and move the rollers to raise or lower the vehicle, operative connections between the motor and one of the axles to turn the same and shift the vehicle sidewise in either direction, and a single operating handle controlling all of said movements.

5. The combination with a motor driven vehicle, of rollers carried thereby, means including a train of gearing between the motor and the rollers to move the latter to raise or lower the vehicle, means effecting a disconnection in said train of gearing when the limit of movement in either direction has been reached, means operated by the motor for moving the vehicle bodily sidewise in either direction, and a brake for controlling the last mentioned movement.

6. The combination with a motor driven vehicle, of rollers carried thereby, connections between the motor and rollers for operating the latter to raise or lower the vehicle, means for automatically breaking said connections when the limit of movement in either direction has been reached, and means operated by the motor for moving the vehicle bodily sidewise in either direction when supported on said rollers.

7. The combination with a motor driven vehicle, of lifting rollers, their axles, hangers in which the axles are supported, rack bars connected with the hangers, a shaft geared to the rack bars, shiftable gearing between the motor and said shaft, another shaft geared to one of the axles for rotating it, and shiftable gearing between said shaft and the motor whereby the vehicle may be moved sidewise in either direction.

8. The combination with a motor driven vehicle, of lifting rollers, their axles, hangers in which the axles are supported, rack bars connected with the hangers, a shaft geared to the rack bars, shiftable gearing between the motor and said shaft, another shaft geared to one of the axles for rotating it, shiftable gearing between said shaft and the motor whereby the vehicle may be moved sidewise in either direction, and a single lever for shifting the gearing.

In testimony whereof, we have hereunto subscribed our names.

ARTHUR W. ALLEN.
ALEXANDER E. KOSHELL.